United States Patent [19]

Davis

[11] Patent Number: 5,499,586
[45] Date of Patent: Mar. 19, 1996

[54] SOIL DECONTAMINATION AND REMEDIATION SYSTEM

[75] Inventor: Kenneth W. Davis, Mountain View, Wyo.

[73] Assignee: Material Processing, Inc., Salt Lake City, Utah

[21] Appl. No.: 346,783

[22] Filed: Nov. 30, 1994

Related U.S. Application Data

[63] Continuation-in-part of Ser. No. 201,313, Feb. 24, 1994, abandoned.

[51] Int. Cl.$^6$ .................................................. A47J 36/00
[52] U.S. Cl. ...................... 110/246; 110/226; 110/203; 110/214
[58] Field of Search ................................ 110/246, 224, 110/226, 203, 214; 47/1.42

[56] References Cited

U.S. PATENT DOCUMENTS

| | | | |
|---|---|---|---|
| 4,402,738 | 9/1983 | Akio | 75/44 |
| 4,951,417 | 8/1990 | Gerken et al. | 110/226 |
| 4,974,528 | 12/1990 | Barcell | 110/226 |
| 5,004,486 | 4/1991 | Chen | 55/222 |
| 5,078,868 | 1/1992 | Robertson | 110/224 |
| 5,101,739 | 4/1992 | Nance | 110/229 |
| 5,152,233 | 10/1992 | Spisak | 110/246 |
| 5,188,041 | 2/1993 | Noland | 110/246 |
| 5,193,291 | 3/1993 | Brashears | 34/12 |
| 5,213,051 | 5/1993 | Kaneko | 110/229 |
| 5,272,833 | 12/1993 | Prill et al. | 47/1.42 |
| 5,273,355 | 12/1993 | May | 366/23 |
| 5,302,118 | 4/1994 | Renegar | 432/14 |
| 5,323,714 | 6/1994 | Cox | 110/229 |
| 5,437,237 | 8/1995 | Digre | 110/229 |

*Primary Examiner*—Thomas E. Denion
*Attorney, Agent, or Firm*—Prince, Yeates & Geldzahler

[57] ABSTRACT

A portable soil decontamination and remediation system comprising a high heat energy generator that supplies high heat energy to a soil decontamination unit. The heat energy generator comprises a closed chamber for gasifying used rubber tires for the production of volatile gases and high energy heat. The soil decontamination unit comprises an elongate rotating cylinder that rotates within a closed chamber. Contaminated soil is introduced into one end of the rotating cylinder and is caused to migrate to the opposite end in a cascading fashion as the cylinder rotates. High energy heat from the generator is directed at the rotating cylinder to indirectly heat the soil therein to vaporize the hydrocarbon contaminants in the soil as the rotating drum migrates the soil toward its collection end. Vacuum pressure withdraws the vaporized hydrocarbons from the cylinder, and the decontaminated soil exits the collection end of the rotating cylinder and housing for redistribution. The vaporized hydrocarbons condense and are collected within a forced-air condenser for recycling or proper disposal. An optional second stage refrigeration unit condenses any residual vaporized hydrocarbons that may be missed by the forced-air condenser.

10 Claims, 10 Drawing Sheets

5,499,586

SOIL DECONTAMINATION AND REMEDIATION SYSTEM

RELATED APPLICATION

This application is a continuation-in-part of my application entitled SOIL DECONTAMINATION AND REMEDIATION SYSTEM, Ser. No. 08/201,313, filed Feb. 24, 1994, now abandoned.

BACKGROUND OF THE INVENTION

1. Field of the Invention

The present invention relates to an apparatus and method for treating contaminated soil, particuarly soil contaminated with hydrocarbons, and particularly relates to such a portable apparatus and method for removing and reclaiming volatile hydrocarbon products from contaminated soil in an environmentally compatible method.

2. Description of the Prior Art

During the oil boom of the last few decades, oil well drilling sites were not noted for their environmental friendliness. The primary concern was to remove the oil and gas (hydrocarbon products) from the ground, with little thought to environmental issues. As a result, there are numerous sites wherein the soil is contaminated with hydrocarbon byproducts, oil sludge, etc.

Environmental awareness having been brought to the forefront, it is now commonly appreciated that it is necessary to go back and clean these previously contaminated areas. Various systems and methods have been attempted to remediate the contaminated soil, i.e., remove the hydrocarbon waste materials therefrom, leaving environmentally acceptable soil. One of these devices is shown in U.S. Pat. No. 5,193,291, which shows a conventional "baghouse" system wherein the contaminated soil is heated directly by a gas furnace flame, the heated soil thereafter being discharged into the baghouse for subsequent separation and discharge.

U.S. Pat. No. 5,188,041 discloses a soil remediation process comprising passing non-oxidizing heated gases over the contaminated soil at a flow rate and temperature to prevent surface drying of the contaminated soil. This system is specifically a low-temperature system, and therefore is incapable of effectively remediating most hydrocarbon contaminated soils. U.S. Pat. No. 5,272,833 shows a similar apparatus and process for remediating contaminated soil. This system is also a baghouse-type system, similar to that of U.S. Pat. No. 5,193,291.

U.S. Pat. No. 5,004,486 discloses a gas cleaning system that directs the exhaust gas from the combustion chamber through a heat exchanger for cooling the gas, and into a bubbling dust separator submerged under water in order to discharge the gas directly into the water for the prevention of air pollution.

U.S. Pat. No. 5,273,355 discloses a rotary drum mechanism for incinerating soil and mixing the soil with heated and dried stone aggregate for the production of asphalt paving. The gas products of combustion from the incinerator are directed into the rotary drum to be further combusted prior to direct discharge into the atmosphere.

U.S. Pat. No. 5,302,118 discloses a soil remediation system comprising a rotary drum having a burner flame directed into one end of the drum, as in U.S. Pat. No. 5,193,291. In addition, as in the '291 Patent, the '118 Patent includes the baghouse-type collection mechanism for collecting dust to prevent its release into the atmosphere.

SUMMARY OF THE INVENTION

The soil decontamination and remediation apparatus of the present invention comprises a three-stage system. The first stage is a combustion chamber that combusts by gasification, waste materials (e.g., used vehicle rubber tires) into high energy heat by gasification in a continuous-burn cycle. The heat energy from the first stage is fed into the second stage, which is a rotating drum that rotates within a closed chamber. The heat energy is directed into the chamber directly against the drum, the rotating drum containing the contaminated soil to be decontaminated by the high heat from the combustion chamber. This high heat is applied to the contaminated soil indirectly so that the hydrocarbons within the soil may be vaporized without burning the soil. The volatile hydrocarbon vapors are then drawn off from the decontaminated soil and introduced into the third stage, which is an air-cooled condensor and hydrocarbon recovery system. This recovery system condenses the hydrocarbon vapors from the volatile exhaust gases to permit reclamation of the hydrocarbons and a clean exhaust gas to be emitted into the atmosphere.

DESCRIPTION OF THE PREFERRED EMBODIMENT

Figure 1:
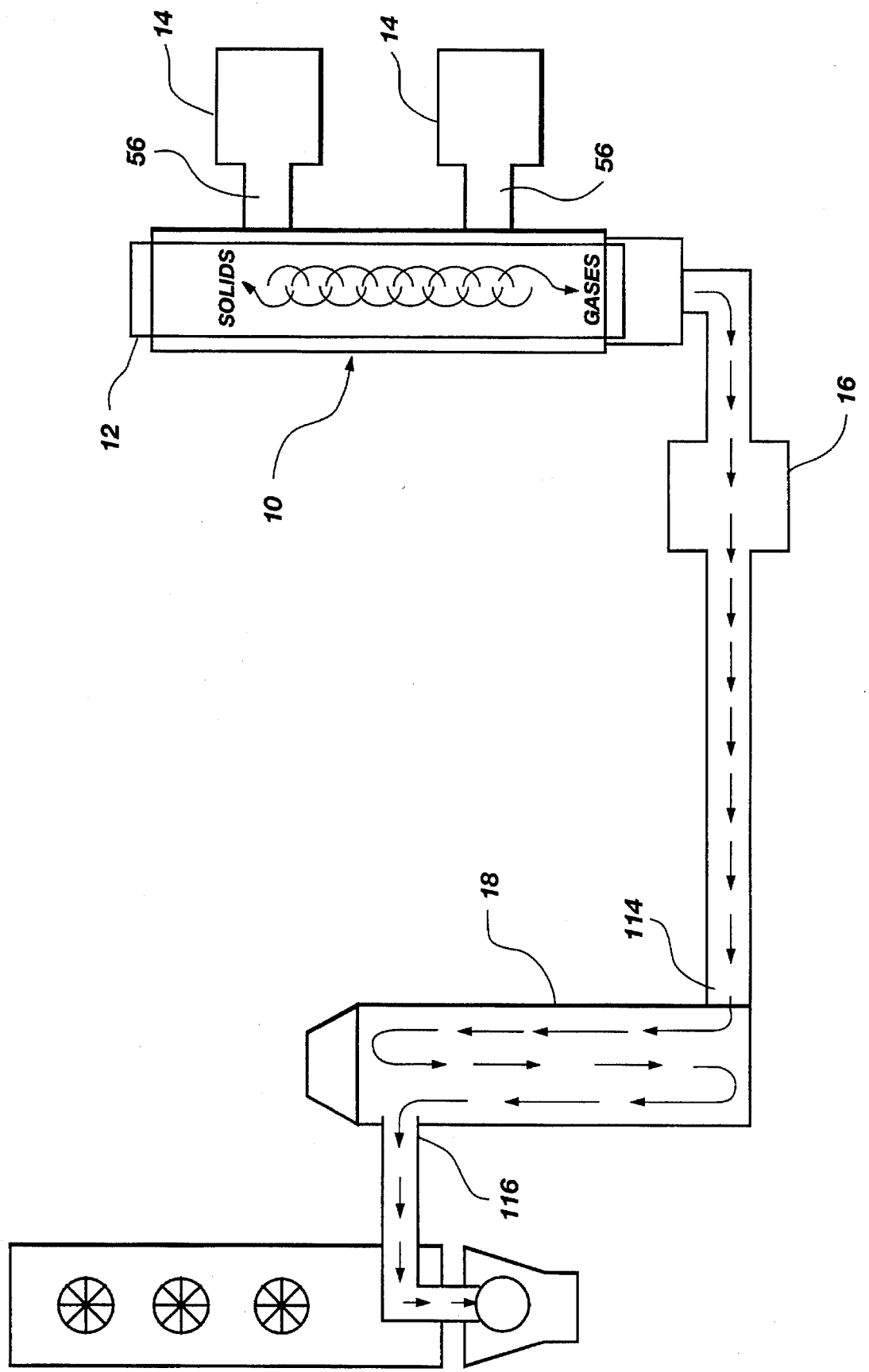
FIG. 1 is a schematic diagram of the soil decontamination and remediation apparatus of the present invention.

Referring now to the drawings, and initially to FIG. 1, the soil decontamination and remediation system of the present invention is shown schematically. In the schematic of FIG.

1, a horizontal trammel unit is shown at 10. The trammel unit includes an internally rotating drum 12 for receiving the soil to be remediated into one end thereof, the soil to migrate through the rotating drum during decontamination thereof, and be expelled from the opposite end of the trammel.

Heat energy for decontaminating and remediating the soil within the horizontal trammel unit 10 is provided by a pair of high heat energy units 14. These heat energy units inject heat directly into the horizontal trammel unit to act directly on the internal rotating drum 12, and therefore indirectly on the soil to be remediated. Volatile hydrocarbon vapors emitted from the soil as it is being remediated are drawn from the horizontal trammel unit 10, and passed through a dust collector 16 prior to entering a forced-air condensor and recovery unit 18. The volatile hydrocarbon vapors are condensed in the condensor and recovery unit 18 for subsequent removal, leaving the cleaned exhaust gas to be drawn through an optional second condensor unit for further condensing of any remaining hydrocarbon vapors within the exhaust gas. Each of the elements of the soil decontamination and remediation system of the present invention will be described in detail hereinbelow in the order of progression through the system.

Figure 2:
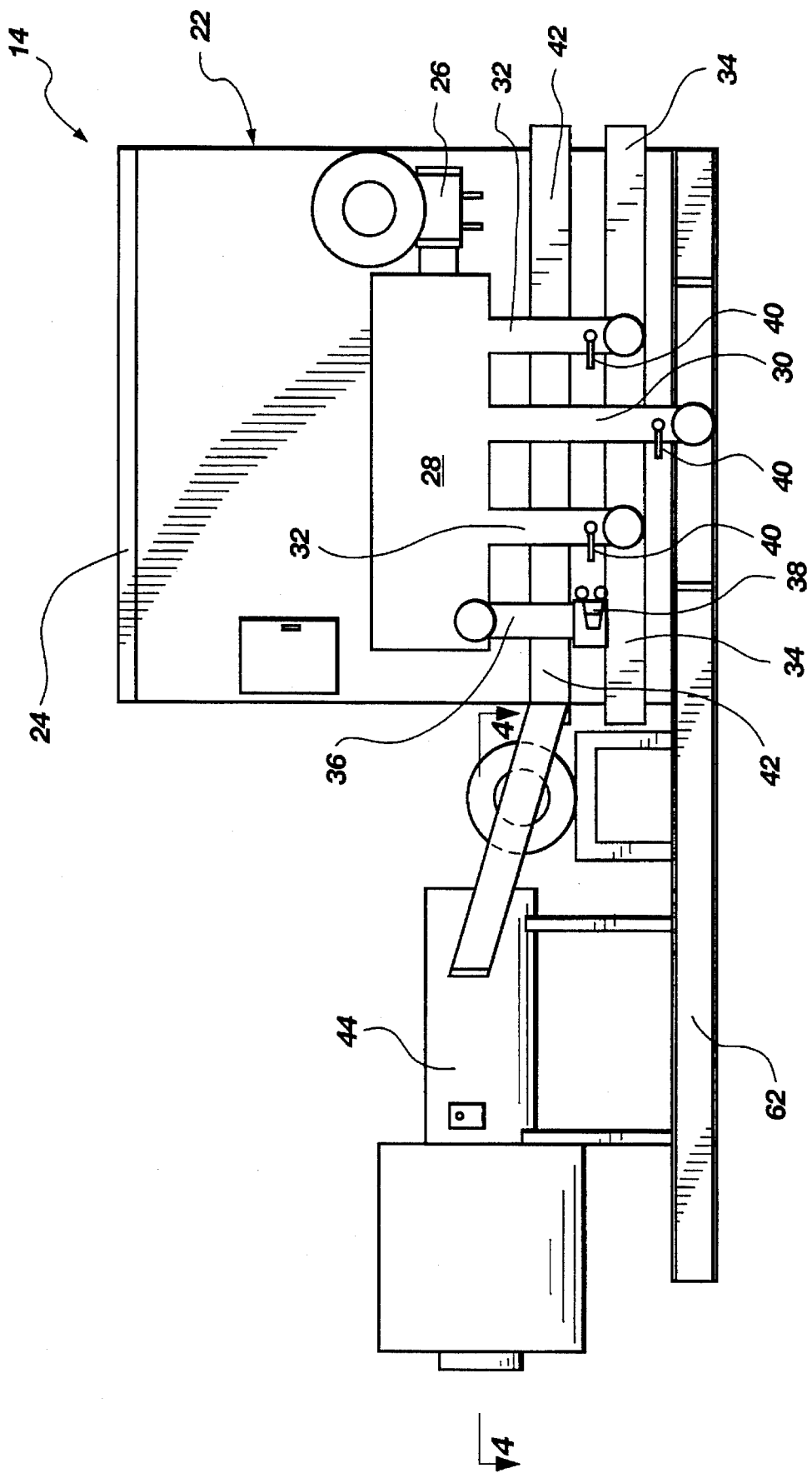
FIG. 2 is a side elevation view of the first stage of the soil decontaminatin and remediation apparatus of the present invention.

With reference now to FIG. 2, the high heat energy unit 14 is shown in side elevation. The heat energy unit 14 comprises a gasification furnace 22 for receiving therein waste materials, as in used vehicle tires, for incineration by dry distillation and gasification. The gasification furnace 22 is a closed system, incorporating a sealable lid 24 that seals the contents of the furnace from the atmosphere. With the furnace 22 filled with used vehicle tires, the lid 24 is sealed down thereagainst and the ignition process is begun.

A blower 26 is mounted on one side of the furnace 22 and injects air from the atmosphere into a manifold 28 for distribution to three sides and the bottom of the furnace. The manifold 28 includes a plurality of conduits that direct the pressurized air into the interior of the gasification furnace 22. Specifically, one of the conduits 30 connects the manifold 28 with an opening in the bottom of the furnace to inject air into the furnace at the approximate geometric center thereof. Two other conduits 32 direct air into a plenum 34 that carries air around to opposite sides of the furnace and injects air from the manifold into the furnace at a plurality of openings along the plenum (not shown). A fourth conduit 36 directs air from the manifold 28 into the side of the furnace shown in FIG. 2. In addition, this conduit 36 also includes a controllable injector 38 for injecting propane directly to the interior of the furnace for initially igniting the tires therein. The propane injector 38 also includes an electric igniter for initially igniting the propane injected into the furnace. Air flow into the furnace is controlled by a plurality of valves 40 within the various conduits 30, 32, 36.

In operation, with the gasification furnace 22 filled with used tires and sealed, the blower 26 introduces air (oxygen) into the furnace at a plurality of locations adjacent the lower portion of the furnace. Propane is injected into the furnace and ignited by the propane injector 38, and, along with the inflow of air (oxygen) from the blower 26, ignites the waste tires. When a sufficient operating temperature is reached, further propane is unnecessary to mainain combustion of the tires within the furnace. The inflow of air into the furnace is controlled to maintain sufficient oxygen to permit the tires and other waste material to maintain conbustion in a continuous-burn mode, and gasify the waste material through dry distillation. In order to efficiently maintain this high degree of heat (200∩F. to 500∩F.) to sustain combustion and dry distillation of the waste ties, the gasification furnace 22 includes a refractory lining of approximately two inches thick, in order to accommodate greater sustained heat generation. Additionally, the sealable lid 24 includes a similar refractory lining.

Inasmuch as the gasification furnace 22 is a closed system, as the used tires combust and vaporize, volatile gases are generated within the furnace. These volatile gases are permitted to exhaust from the furnace via a plurality of openings (not shown) from the interior of the furnace into a second manifold 42, positioned slightly above the various inlets of atmospheric air into the furnace from the blower 26. The manifold 42 collects these volatile gases and directs them into a mixing chamber 44 for mixing with additional air (oxygen) prior to further combustion. This mixing chamber is more clearly shown in FIGS. 3 and 4.

Figure 3:
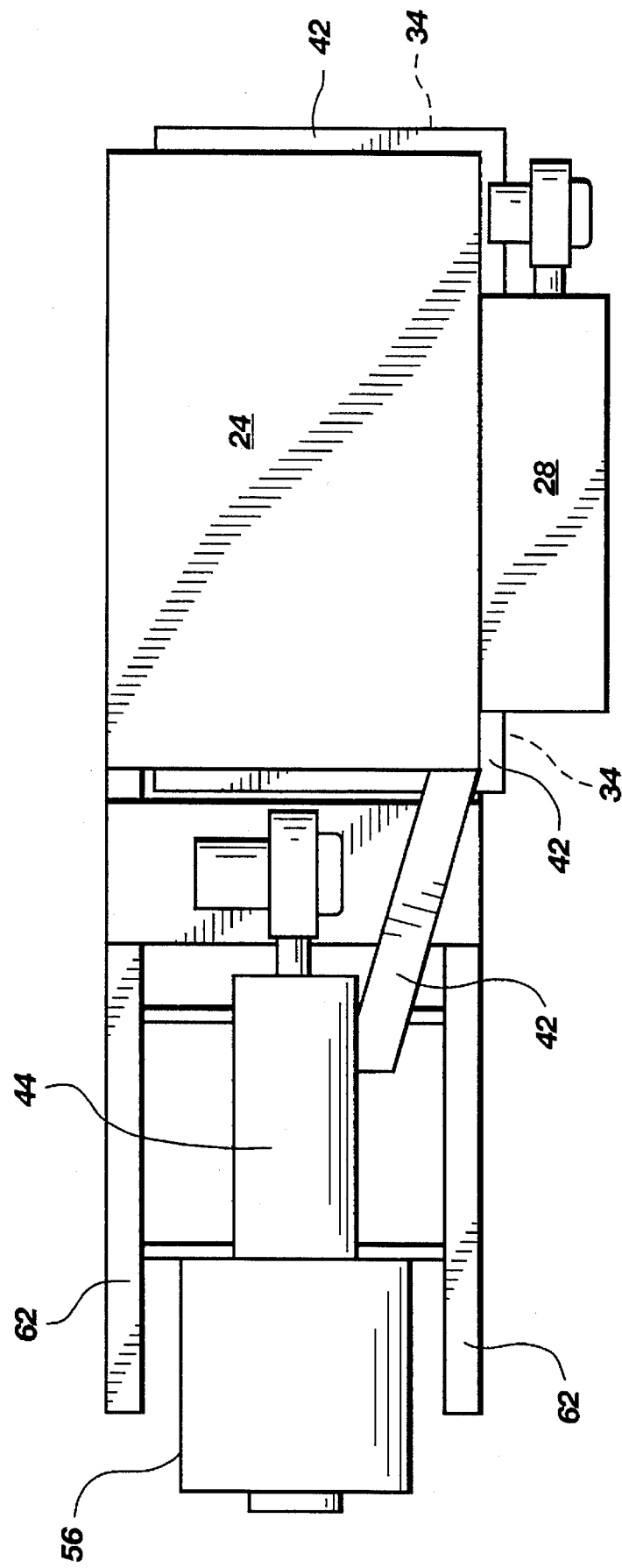
FIG. 3 is a top view of the first stage device.
Figure 4:
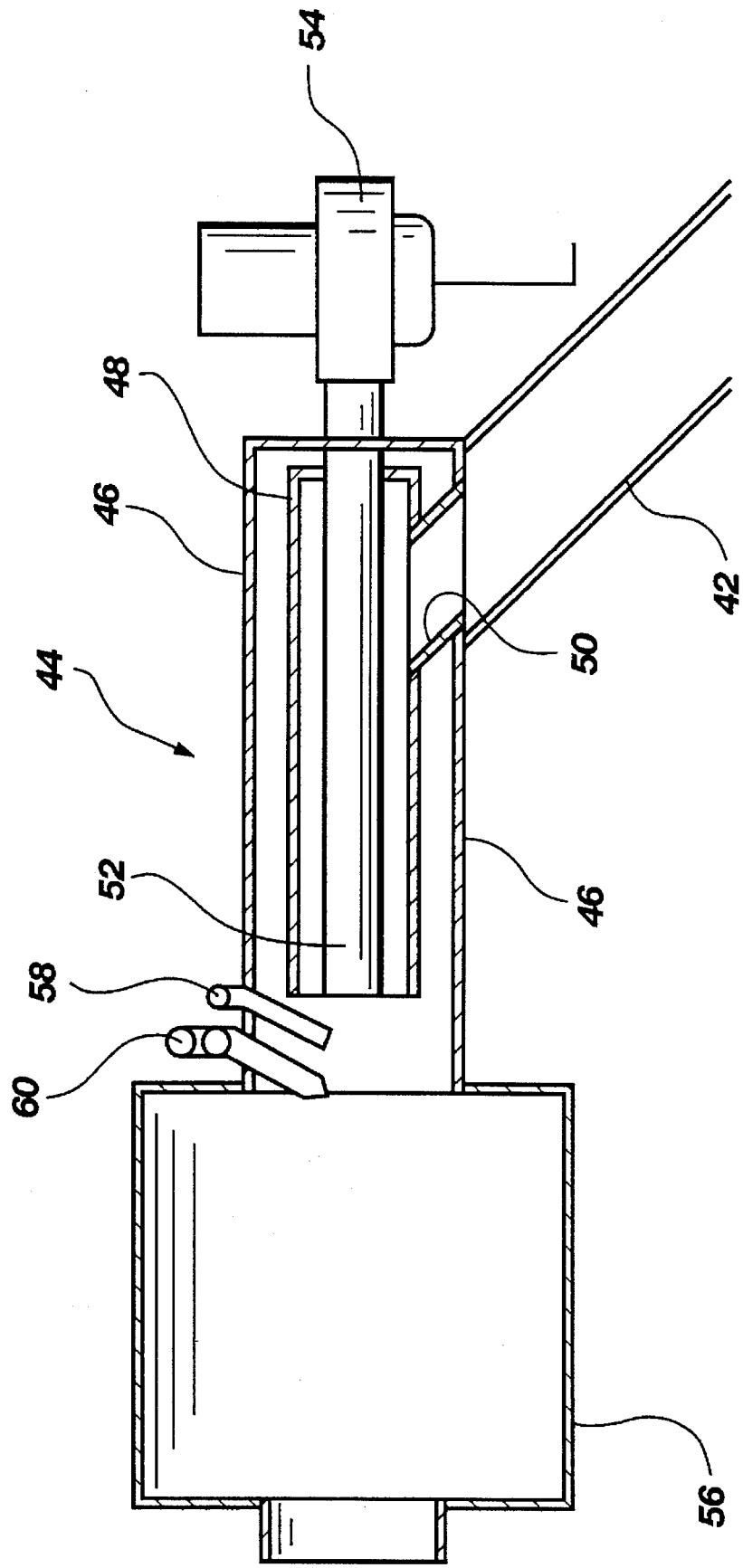
FIG. 4 is a horizontal sectional view of the first stage mixing chamber and combustion chamber taken through lines 4—4 in FIG. 2.

FIG. 3 is a top view of the first stage device of the soil decontaminatin and remediation system, illustrating the relative positions of the furnace and the various manifolds and conduits associated therewith, and the mixing chamber and combustion chamber. As shown, the second manifold 42 directs volatile gases exhausting from the gasification furnace 22 directly into the mixing chamber 44. The interior of the mixing chamber is best shown in FIG. 4. The mixing chamber comprises an outer enclosure 46, preferably circular, and having an intermediate conduit 48 therein in essentially axial concentricity. A short robe 50 provides communication between the interiors of the second manifold 42 and the intermediate conduit 48, so that the volatile exhaust gases from the furnace 22 are directed into the interior of the intermediate conduit 48. An inner conduit 52 is positioned concentrically within the intermediate conduit 48, and is connected to a second blower 54 for introducing air from the atmosphere directly into the mixing chamber 44.

As those skilled in the art will readily appreciate, volatile gases from the furnace 22 flow through the second manifold 42, into the interior of the intermediate conduit 48, and directly into a combustion chamber 56, as shown in FIG. 4. Pressurized air provided by the blower 54 is forced through the inner conduit 52 and exits at a location adjacent that of the volatile gases from the furnace exiting the intermediate conduit 48. Air flow through the inner conduit 52 mixes with the volatile gases, and this gas-air mixture flows into the combustion chamber 56.

The outer enclosure 46 includes a second propane injector 58 and igniter 60. When the system is initially started, propane is injected into the air-volatile gas mixture, and then ignited by the igniter to create combustion in the combustion chamber 56. Once this mixture has been ignited, the propane is shut off, and the volatile gas and air mixture continues to combust in the combustion chamber.

Referring again to FIGS. 2 and 3, the furnace, its associated manifolds, air injectors, etc., and the mixing chamber 44 and combustion chamber 56 are shown mounted on a pair of skid rails 62. In this manner, the first stage of the soil decontamination and remediation system of the present invention can be readily transported, along with the remaining stages, to the site of contaminated soil for direct on-site soil decontamination and remediation.

Briefly returning to the schematic of FIG. 1, it is shown that two high heat energy units 14, as shown in detail in FIGS. 2–4, are used with the soil decontamination and remediation system of the present invention. The combustion chambers 56 of each unit are attached directly into the side of the second stage of the soil remediation system, specifically the horizontal trammel unit 10.

Figure 5:
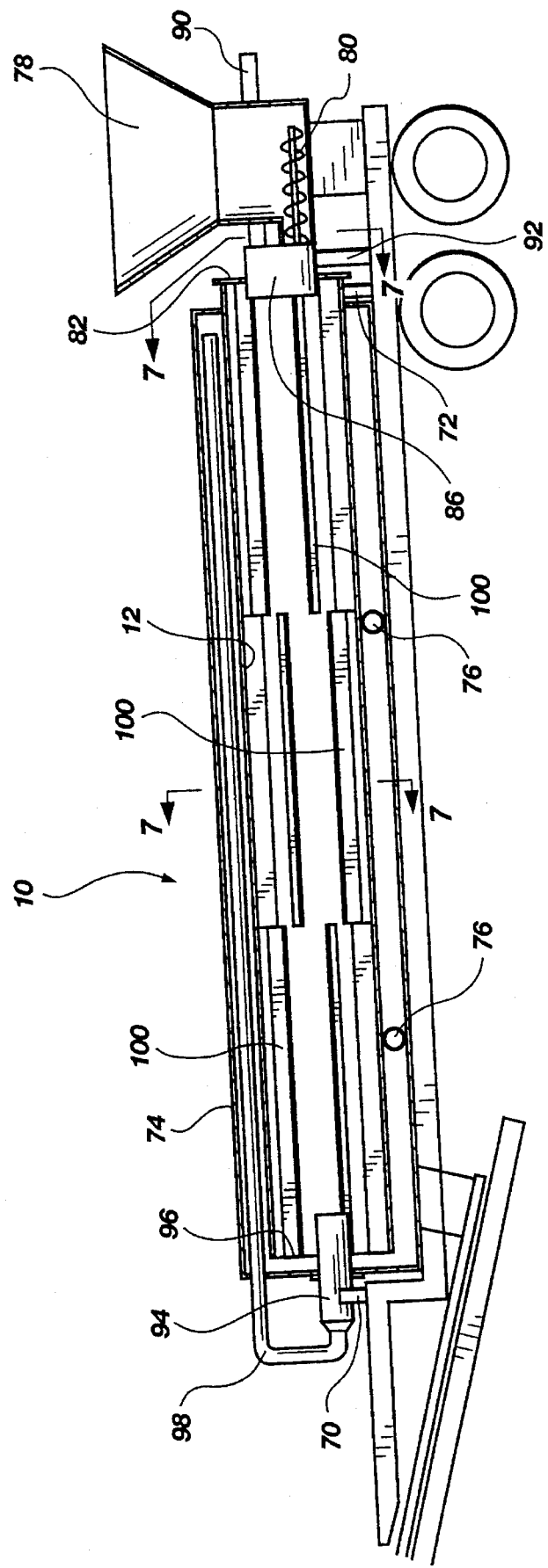
FIG. 5 is a vertical sectional view through the second stage of the soil remediation apparatus, specifically the rotating drum that holds the soil to be decontaminated.

Turning now to FIG. 5, the horizontal trammel unit 10 is shown in vertical section. The trammel includes the internal rotating drum 12 that rotates on trunnions 70 on the left and 72 on the right. The rotating drum 12 rotates concentrically about its longitudinal axis within a longitudinal insulated shell 74 into which the combustion chambers 56 from the heat energy units 14 direct their respective blasts of ignited volatile gas and air mixtures.

The rotating drum 12 is essentially a closed drum, open only at one end (the right end as shown in FIG. 5) for the introduction of contaminated soil thereinto, and the withdrawal of hydrocarbon vapors therefrom. In addition, the drum includes two openings adjacent the opposite end (the left end as shown in FIG. 5), which permit the decontaminated and remediated soil to drop out therefrom as the drum rotates.

In operation, two respective combustion chambers 56 are attached directly to the insulated shell 74 of the trammel unit as indicated in FIG. 1. Specifically, each combustion chamber 56 attaches to the shell 74 at a respective inlet 76 for injecting heat from the pair of high heat energy units 14 directly into the annular space within the insulated shell and around the rotating drum, in order to indirectly heat the contaminated soil as the soil migrates through the drum. Soil is introduced into the rotating drum via a hopper 78 and an auger 80 that transports the contaminated soil directly into the interior of the drum at the right end as shown at FIG. 5.

Figure 6:
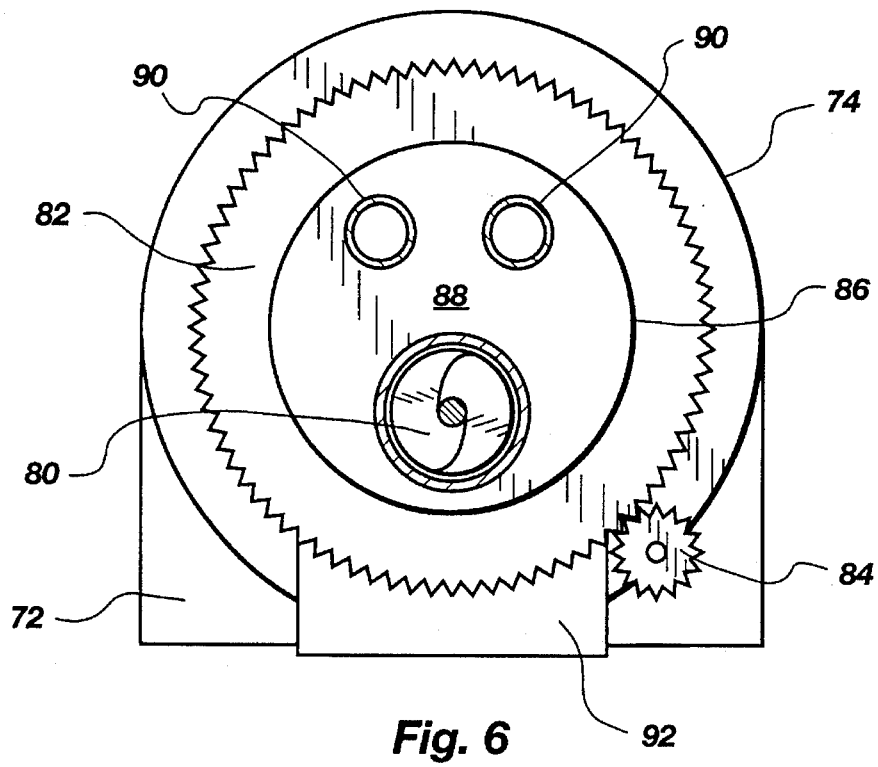
FIG. 6 is a vertical sectional view through the rotating drum and housing, taken along lines 6—6 in FIG. 5.

FIG. 6 is a vertical plan view taken along lines 6—6 in FIG. 5, and more clearly illustrates how the stationary auger 80 introduces the contaminated soil into the rotating drum 12. The rotating drum 12 is supported by, and rotates on, trunnions 72 along its outside diameter. The drum includes an externally toothed ring 82 formed therewith, and by which the drum is rotated via a drive gear mechanism 84. A stationary cylindrical section 86 (best shown in FIG. 5) is positioned within the toothed ring 82 such that the ring rotates around the cylindrical section 86. The cylindrical section 86 is closed at one end (the right end as shown in FIG. 5) by an end plate 88 which has openings therein for the auger 80 and two hydrocarbon vapor suction conduits 90. The stationary cylindrical section 86 is supported on the platform by brace 92.

The rotating drum 12 is supported at its opposite end (the left end as shown in FIG. 5) by a hollow bushing 94 formed with the end plate 96 of the drum. The hollow bushing 94 is supported by and rotates on trunnion 70 in a customary manner. The hollow bushing provides communication between the interior of the rotating drum and a separate conduit 98 within the interior of the insulated shell. The conduit 98 is open to the interior of the shell at the upper end thereof (the right end as shown in FIG. 5) when the system is operating. The function of the open conduit 98 within the trammel unit insulated shell will be explained in greater detail hereinbelow.

Figure 7:
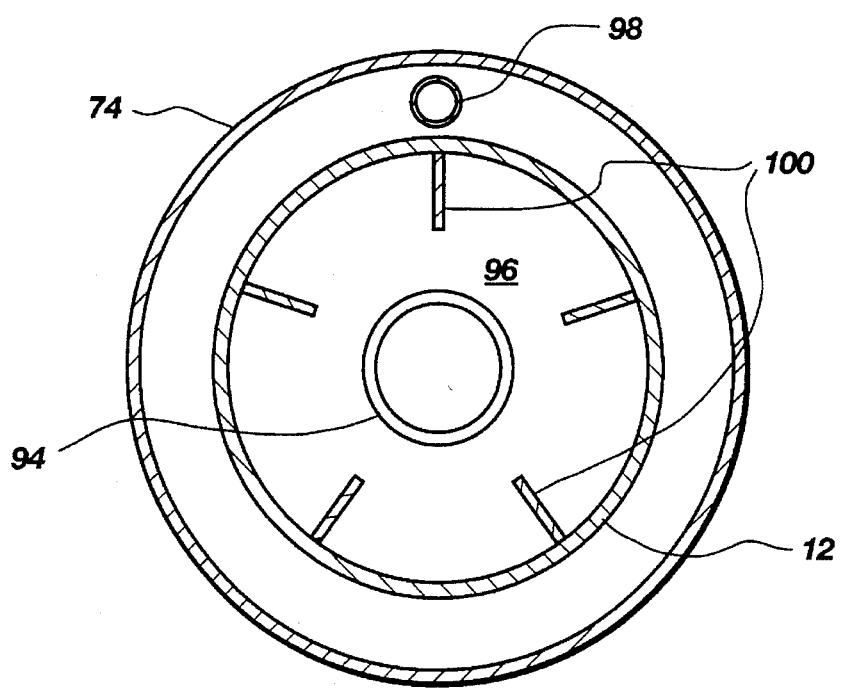
FIG. 7 is a vertical sectional view taken along lines 7—7 in FIG. 5, illustrating the interior vanes for creating the migration of the soil to be remediated through the rotating drum.

FIG. 7 illustrates the plurality of vanes within the rotating drum that cause the contaminated soil to migrate along the inner diameter of the drum as the drum rotates. The direction of migration of the soil within the drum is from right to left as shown in FIG. 5. As the drum rotates, these vanes function to lift individual portions of the contaminated soil and then cascade and disburse this soil as it slowly migrates from right to left within the drum. Inasmuch as the drum is inclined slightly downwardly at its left end, the tumbling effect of the contaminated soil within the drum caused by the vanes causes the contaminated soil to slowly migrate toward the left end of the drum as it is being constantly rotated, heated, cascaded, agitated, and migrated by the tumbling effect of the drum.

The drum includes at least one exit opening (not clearly shown) adjacent the left end thereof that permits a certain amount of remediated soil to drop therefrom with each revolution of the drum. In practice, this exit opening takes the form of a rectangular opening adjacent the drum end plate 96. The longitudinal insulated shell 74 includes a similar opening in the bottom thereof aligned with the opening in the rotating drum so that the remediated soil may drop directly therethrough and onto a conveyor belt, or the like, for transporting back to its original location.

One or more hydrocarbon vapor suction conduits 90 draw the vaporized hydrocarbons that are vaporized in the soil remediation process from within the interior of the rotating drum and to the third stage, the hydrocarbon condensor, of the soil decontamination and remediation system, described hereinbelow. The vacuum pressure that draws the vaporized hydrocarbons from the decontaminated soil within the rotating drum also draws a certain amount of high temperature exhaust from the high heat energy units 14 from the annulus around the rotating drum through the conduit 98, hollow bushing 94, and into the interior of the rotating drum in order to assist, by direct heat, further vaporization of the hydrocarbon contaminants within the soil. Specifically, the heat blasting from the combustion chambers 56 into the insulated shell 74 surrounds the rotating drum and directly heats the rotating drum to indirectly heat the contaminated soil therein. Inasmuch as this heat from the combustion chambers is under pressure, the pressure within the insulated shell 74 is permitted to escape (accompanied by the aforementioned vacuum) through the separate conduit 98, the hollow bushing 94, and into the interior of the rotating drum, again, to assist in the vaporization of the hydrocarbons from the contaminated soil. The vaccum applied at the hydrocarbon vapor suction conduits 90 draws the vaporized hydrocarbons from the interior of the rotating drum, through the dust collector 16 and into the forced-air condensor and recovery unit 18, as shown in the schematic of FIG. 1.

Figure 8:
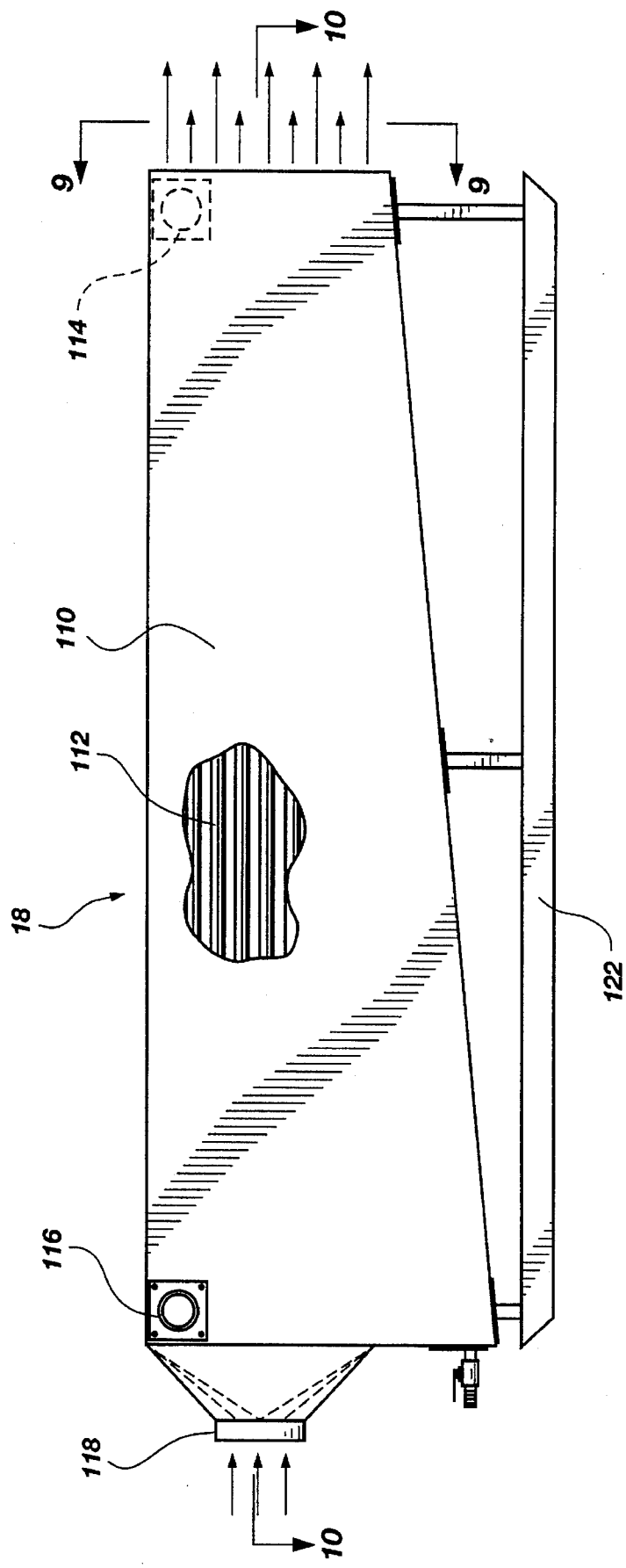
FIG. 8 is a side view of the third stage of the soil remediation apparatus, specifically the condensor for condensing and reclaiming the hydrocarbon products from the volatile gases exhausted from the contaminated soil.

FIG. 8 is a side view of the third stage of the soil reclamation and remediation system, comprising the forced-air condensor for condensing and reclaiming hydrocarbon products from the vaporized hydrocarbon gases exhausted from the contaminated soil within the rotating drum. The forced-air condensing and recovery unit 18 comprises a closed housing 110 having a plurality of conduits (pipes) 112 passing therethrough longitudinally. This is more clearly shown in FIGS. 9 and 10. The housing 110 includes an inlet 114 for the introduction of the vaporized hydrocarbons and exhaust gases from the horizontal trammel unit 10, and an outlet 116 for the exhaust gases remaining after the hydrocarbons have been condensed within the forced-air condensing unit.

Figure 9:
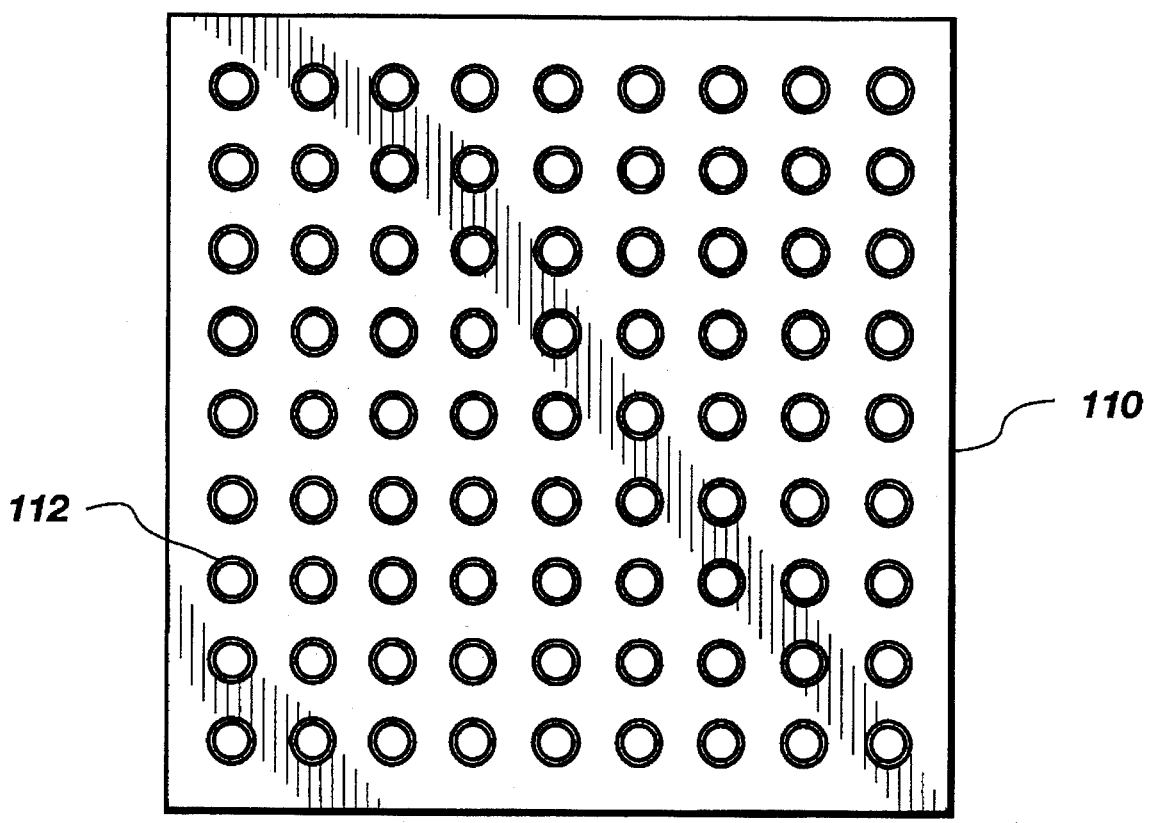
FIG. 9 is an end view of the condensing unit of FIG. 8, taken along lines 9—9 in FIG. 8, and illustrating the flow of ambient temperature air through the condensing tubes.
Figure 10:
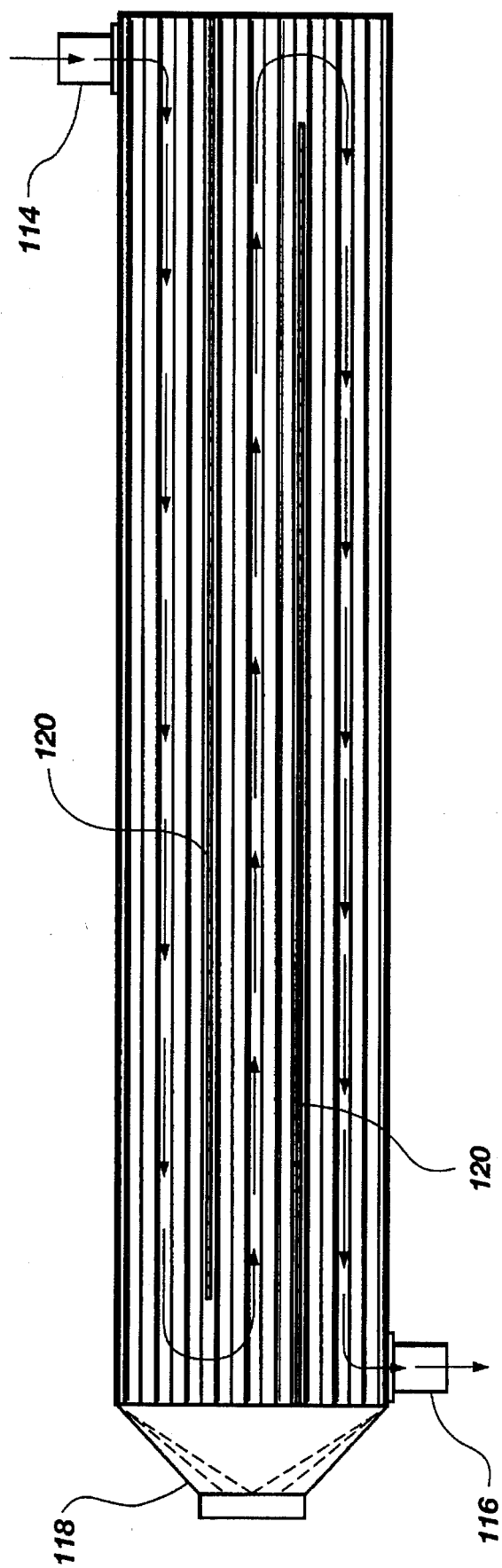
FIG. 10 is a horizontal sectional view taken along lines 10—10 in FIG. 8, and illustrating the flow of exhaust gases through the condensor.

As best shown in FIG. 9, the forced-air condensing and recovery unit includes the plurality of pipes 112 passing longitudinally therethrough. Cold air flows through these pipes under pressure from a fan and shroud 118 at the opposite end of the unit (at the left end as shown in FIGS. 8 and 10) to cause the vaporized hydrocarbons in the exhaust gases to condense on the outside of the pipes within the housing 110. As shown in FIG. 8, the bottom of the condensing and recovery unit 18 is slopped downwardly toward the left to permit the condensed hydrocarbons to be collected and periodically drained from the collecting pan.

FIG. 10 illustrates the serpentine pattern that the vaporized hydrocarbons and exhaust gases follow as the exhaust gases flow through the forced-air condensing and recovery unit. This serpentine pattern is created by a plurality of baffles 120 within the housing 110. As can be appreciated, these baffles are vertical, and span the entire height from top to bottom within the forced-air condensing and recovery unit housing 110. In addition, like the high heat energy units 14, the forced-air condensing and recovery unit 18 includes skids 122 to enable a unit to be easily transported and attached to the conduits that interconnect the various elements of the soil decontamination and remediation system.

It should be appreciated that the forced-air condensing and recovery unit uses air at ambient temperature for condensing the vaporized hydrocarbons from the exhaust gases. In most instances, this works quite well to recover essentially all of the vaporized hydrocarbons from the exhaust gases. In unusually warm climates, however, air at ambient temperature may not be adequate to fully condense all of the vaporized hydrocarbons from the exhaust gases. In these instances, a second stage in the condensing process may be utilized. This second stage is shown schematically in FIG. 11, and can be referred to as a chiller.

Exhaust gases from the forced-air condensing and recovery unit 18 that still contain trace amounts of vaporized hydrocarbons are drawn through a closed collection unit 130 at inlet 132. The collection unit 130 includes a series of condensing coils, shown schematically at 134. The vaporized hydrocarbons pass through the condensing coils and are condensed on the coils and collect at the bottom of the collection unit 130 for periodic removal. The remaining clean exhaust gases exit the closed collection unit at the outlet 136 to be exhausted to atmosphere.

The condensing coils 134 communicate directly with a heat exchanger 140 to transfer heat from the condensing hydrocarbons to the heat exchanger. These condensing coils 138 carry a mixture of 30% glycol and water, maintained at approximately 30 degrees F. The heat exchanger 140 transfers heat from the glycol and water mixture to a conventional freon refrigeration circuit 142 that draws heat from the freon and distributes it to atmosphere in a conventional manner.

Figure 11:
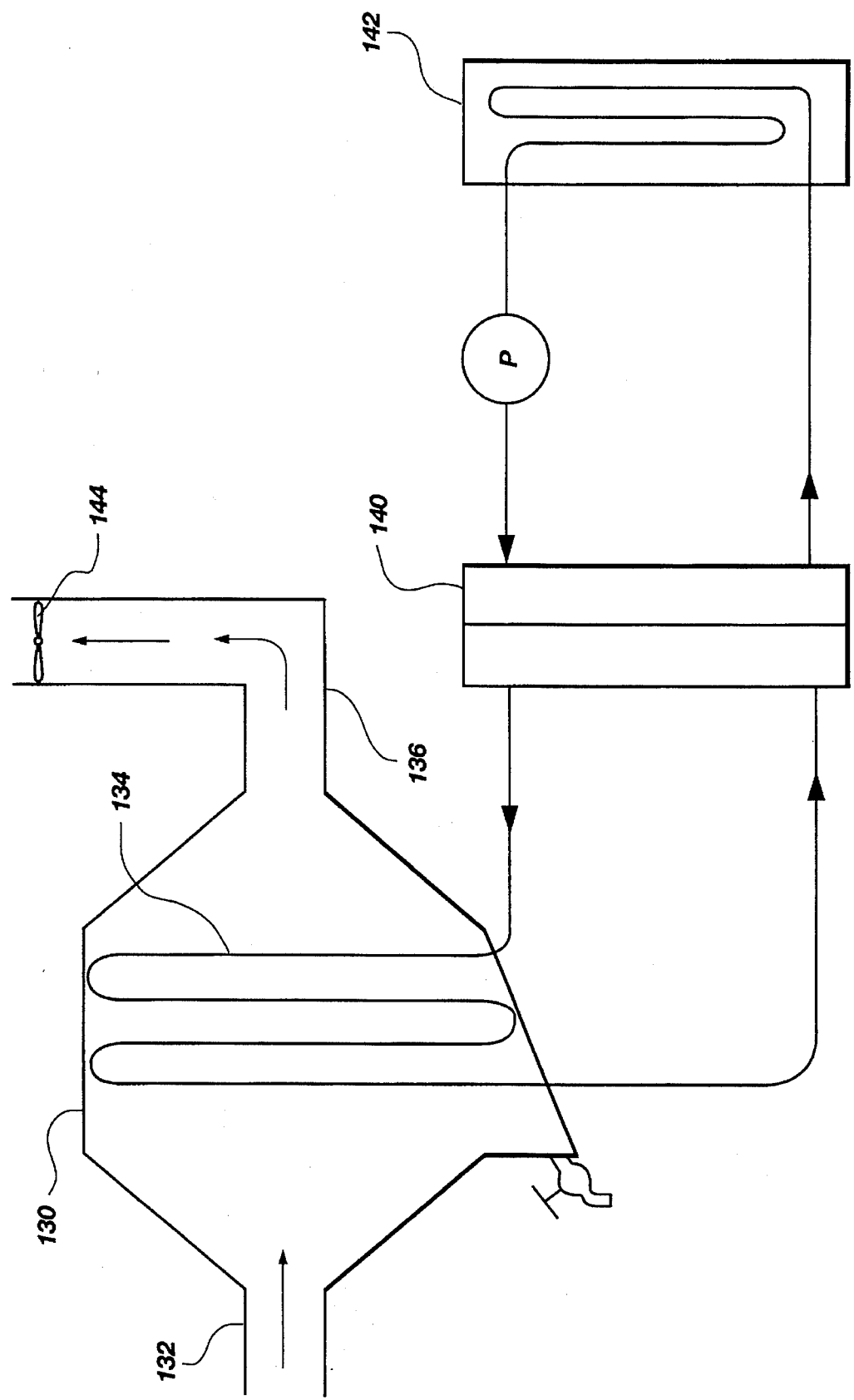
FIG. 11 is a schematic diagram of the optional second stage of the condensing unit, illustrating the glycol and water condensing system, the heat exchanger, and the freon refrigeration unit.

Whether the soil decontamination and remediation system of the present invention utilizes only the forced-air condenser shown in FIGS. 8–10, or both the FIGS. 8–10 forced-air condenser and the FIG. 11 refrigeration unit chiller, exhaust gases are drawn through the system by an exhaust fan 144 located at the point of exhaust to the atmosphere. In either configuration, the exhaust fan provides the vacuum to draw the vaporized hydrocarbons through the system for condensation and reclamation, and exhausts the cleaned gases to atmosphere.

From the foregoing, it will be seen that this invention is one well adapted to attain all of the ends and objectives herein set forth, together with other advantages which are obvious and which are inherent to the apparatus. It will be understood that certain features and subcombinations are of utility and may be employed with reference to other features and subcombinations. This is contemplated by and is within the scope of the claims. As many possible embodiments may be made of the invention without departing from the scope of the claims. It is to be understood that all matter herein set forth or shown in the accompanying drawings is to be interpreted as illustrative and not in a limiting sense.

What is claimed is:

1. A soil remediation apparatus, comprising:
   (a) a heat energy generator comprising
      (1) a vaporization chamber for receiving and holding waste materials to be vaporized;
      (2) air supply means for supplying air under slight pressure into the vaporization chamber;
      (3) fuel supply means for supplying fuel into the vaporization chamber;
      (4) a volatile gas withdrawal manifold communicating with the vaporization chamber for withdrawing volatile gases from the vaporization chamber;
      (5) a mixing chamber having a volatile gas inlet communicating with the volatile gas withdrawal manifold, air pressure means for introducing pressurized air thereinto, a fuel injector, and ignition means for igniting a gas\fuel\air mixture, and an outlet; and
      (6) a combustion chamber that communicates with the mixing chamber outlet, the combustion chamber having an outlet;
   (b) a soil remediator, comprising:
      (1) a housing communicating with the combustion chamber outlet, whereby ignited gas/fuel/air mixture acts directly into the interior of the housing;
      (2) a rotary drum mounted for rotation about its longitudinal axis within the housing, the drum having an inlet and an outlet adjacent opposite ends thereof;
      (3) vane means within the rotary drum for migrating the soil within the drum as the drum rotates;
      (4) a discharge outlet formed in the housing adjacent the drum outlet for discharging the soil from the housing; and
      (5) a vapor discharge outlet for withdrawing volatile vapors from the contaminated soil; and
   (c) a hydrocarbon recovery system comprising:
      (1) a housing having a hydrocarbon vapor inlet communicating with the soil remediation vapor discharge outlet, and an exhaust gas outlet;
      (2) condensing means for condensing the hydrocarbon vapor from exhaust gases.

2. A soil remediation apparatus as set forth in claim 1, wherein the soil remediator is mounted on a wheeled vehicle for portability, and wherein the heat energy generator and hydrocarbon recovery system are mounted on skids for portability.

3. A soil remediation apparatus as set forth in claim 1, further comprising a dust collector intermediate the soil remediator and hydrocarbon recovery system for filtering the vaporized hydrocarbon and exhaust gases prior to condensation and separation of the hydrocarbons from the exhaust gases.

4. A soil remediation apparatus as set forth in claim 1, further comprising a second-stage hydrocarbon recovery system comprising a water-cooled condensor and freon refrigeration heat exchanger.

5. A soil remediation apparatus as set forth in claim 1, further comprising a second heat energy generator essentially identical to the first heat energy generator.

6. A soil remediation apparatus as set forth in claim 1, wherein the heat energy generator vaporization chamber and the soil remediator housing include linings of a refractory material.

7. A soil remediation apparatus as set forth in claim 1, wherein the rotational longitudinal axis of the soil remediator rotary drum is inclined relative to horizontal, with the drum inlet adjacent the higher end and the drum outlet adjacent the lower end.

8. A soil remediation apparatus as set forth in claim 1, wherein the vaporization chamber is essentially air-tight.

9. A soil remediation apparatus as set forth in claim 1, wherein the heat energy generator volatile gas withdrawal manifold is disposed at an elevation higher than the elevations of the air supply means and fuel supply means.

10. A soil remediation apparatus as set forth in claim 1, wherein the heat energy generator air supply means is manually adjustable for controlling the amount of air being supplied into the vaporization chamber for combustion.

\* \* \* \* \*